US010338201B2

(12) United States Patent
Slobodyanyuk et al.

(10) Patent No.: US 10,338,201 B2
(45) Date of Patent: Jul. 2, 2019

(54) TIMING SYNCHRONIZATION OF LIDAR SYSTEM TO REDUCE INTERFERENCE

(71) Applicant: QUALCOMM Incorporated, San Diego, CA (US)

(72) Inventors: Volodimir Slobodyanyuk, San Diego, CA (US); Daniel Butterfield, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 15/263,613

(22) Filed: Sep. 13, 2016

(65) Prior Publication Data

US 2017/0082737 A1  Mar. 23, 2017

Related U.S. Application Data

(60) Provisional application No. 62/220,168, filed on Sep. 17, 2015.

(51) Int. Cl.
*G01S 7/497* (2006.01)
*G01S 17/08* (2006.01)
*G01S 17/02* (2006.01)
*G01S 7/484* (2006.01)

(52) U.S. Cl.
CPC ............. *G01S 7/497* (2013.01); *G01S 7/484* (2013.01); *G01S 17/023* (2013.01); *G01S 17/08* (2013.01)

(58) Field of Classification Search
CPC ... G01C 21/165; G01S 13/931; G01S 17/023; G01S 17/936; G01S 19/43; G01S 13/865; G01S 13/867; G08G 1/20; G08G 1/0112
See application file for complete search history.

(56) References Cited

U.S. PATENT DOCUMENTS

| 7,975,160 B2 | 7/2011 | Smith et al. |
| 7,978,136 B2 | 7/2011 | Duffet-Smith et al. |
| 8,688,874 B2 | 4/2014 | Foster |
| 2003/0198271 A1* | 10/2003 | Matveev .................. B60Q 1/14 372/92 |

(Continued)

FOREIGN PATENT DOCUMENTS

| EP | 2759848 A1 | 7/2014 |
| WO | 2015107529 A1 | 7/2015 |
| WO | 2015170068 A1 | 11/2015 |

OTHER PUBLICATIONS

International Search Report and Written Opinion—PCT/US2016/051735—ISA/EPO—dated Dec. 13, 2016.

*Primary Examiner* — Luke D Ratcliffe
(74) *Attorney, Agent, or Firm* — Muncy, Geissler, Olds & Lowe, P.C.

(57) ABSTRACT

An example method for use with a LIDAR system includes assigning a firing time of a laser included in the LIDAR system. The assignment of the firing time includes: (i) receiving a universal clock signal at the LIDAR system, where the universal clock signal common to one or more other LIDAR systems; (ii) synchronizing a system clock of the LIDAR system to the universal clock signal to generate a synchronized clock signal; and determining the firing time based on the synchronized clock signal to reduce interference with the one or more other LIDAR systems. The method also includes firing the laser at the firing time.

15 Claims, 6 Drawing Sheets

(56) References Cited

U.S. PATENT DOCUMENTS

| | | | |
|---|---|---|---|
| 2009/0140887 A1* | 6/2009 | Breed | G01C 21/165 340/990 |
| 2012/0005517 A1 | 1/2012 | Foster et al. | |
| 2014/0010554 A1 | 1/2014 | Midavaine | |
| 2015/0131080 A1 | 5/2015 | Retterath et al. | |

* cited by examiner

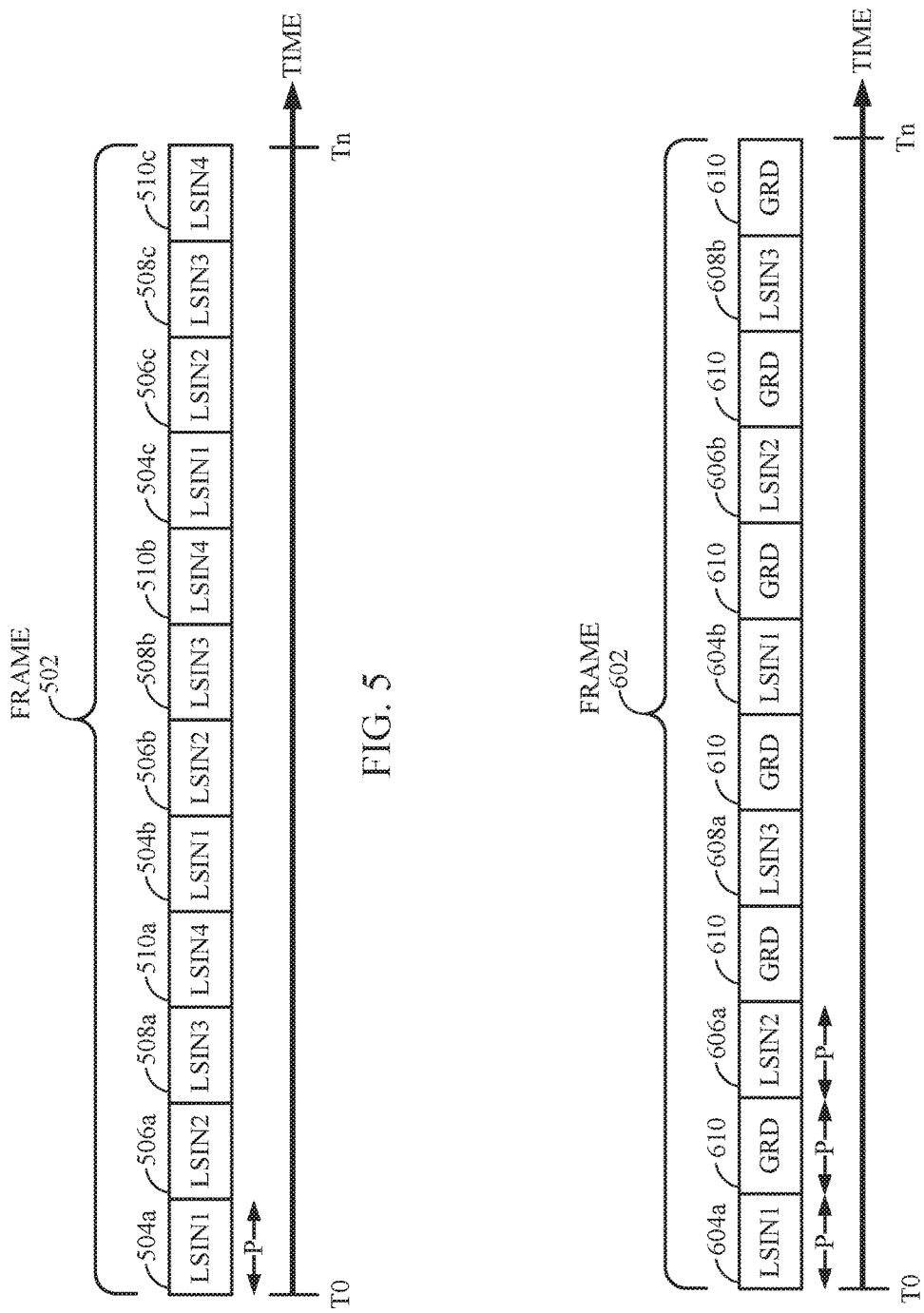

TIMING SYNCHRONIZATION OF LIDAR SYSTEM TO REDUCE INTERFERENCE

CROSS-REFERENCE TO RELATED APPLICATION

The present Application for Patent claims the benefit of U.S. Provisional Application No. 62/220,168, entitled "TIMING SYNCHRONIZATION OF LIDAR SYSTEM TO REDUCE INTERFERENCE" filed Sep. 17, 2015, assigned to the assignee hereof and expressly incorporated herein by reference in its entirety.

FIELD OF DISCLOSURE

This disclosure relates generally to LIght Detection And Ranging (LIDAR) systems and, in particular but not exclusively, relates to a single laser LIDAR system.

BACKGROUND

With the proliferation of operation of LIDAR systems, the frequency of occurrences where multiple LIDAR systems are operating in the close vicinity to each other will increase. This operation of multiple LIDAR systems in close proximity to each other will create a potential for each system to become a source of jamming and/or of an interfering signal for another LIDAR system.

SUMMARY

Aspects of the present disclosure include a method, an apparatus, a LIDAR system, and computer-readable medium for assisting or otherwise perform timing synchronization of the LIDAR system to reduce interference with other LIDAR systems. For example, according to one aspect, an example method for use with a LIght Detection And Ranging (LIDAR) system includes assigning a firing time of a laser included in the LIDAR system. The assignment of the firing time includes: (i) receiving a universal clock signal at the LIDAR system, where the universal clock signal common to one or more other LIDAR systems; (ii) synchronizing a system clock of the LIDAR system to the universal clock signal to generate a synchronized clock signal; and determining the firing time based on the synchronized clock signal to reduce interference with the one or more other LIDAR systems. The method also includes firing the laser at the firing time.

According to another aspect, a LIght Detection And Ranging (LIDAR) system includes a laser, memory, and a processing unit coupled to the memory to access and execute instructions included in program code to direct the LIDAR system to assign a firing time of the laser and to fire the laser at the firing time. The instructions to assign the firing time includes instructions to: (i) receive a universal clock signal at the LIDAR system, the universal clock signal common to one or more other LIDAR systems; (ii) synchronize a system clock of the LIDAR system to the universal clock signal to generate a synchronized clock signal; and (iii) determine the firing time based on the synchronized clock signal to reduce interference with the one or more other LIDAR systems.

According to yet another aspect, a LIght Detection And Ranging (LIDAR) system includes a laser, means for assigning a firing time of a laser included in the LIDAR system, and means for firing the laser at the firing time. The means for assigning the firing time includes: (i) means for receiving a universal clock signal at the LIDAR system, the universal clock signal common to one or more other LIDAR systems; (ii) means for synchronizing a system clock of the LIDAR system to the universal clock signal to generate a synchronized clock signal; and (iii) means for determining the firing time based on the synchronized clock signal to reduce interference with the one or more other LIDAR systems.

In another aspect, a non-transitory computer-readable medium includes program code stored thereon for use by a LIght Detection And Ranging (LIDAR) system. The program code includes instructions to assign a firing time of a laser included in the LIDAR system and to fire the laser at the firing time. The instructions to assign the firing time includes instructions to: (i) receive a universal clock signal at the LIDAR system, the universal clock signal common to one or more other LIDAR systems; (ii) synchronize a system clock of the LIDAR system to the universal clock signal to generate a synchronized clock signal; and (iii) determine the firing time based on the synchronized clock signal to reduce interference with the one or more other LIDAR systems.

BRIEF DESCRIPTION OF THE DRAWINGS

The accompanying drawings are presented to aid in the description of aspects of the invention and are provided solely for illustration of the aspects and not limitation thereof.

FIG. 5 is a timing diagram illustrating a frame divided into several timeslots for assigning firing times for a LIDAR system.

FIG. 6 is a timing diagram illustrating a frame divided into guard timeslots and active timeslots for assigning firing times for a LIDAR system.

DETAILED DESCRIPTION

Figure 1:
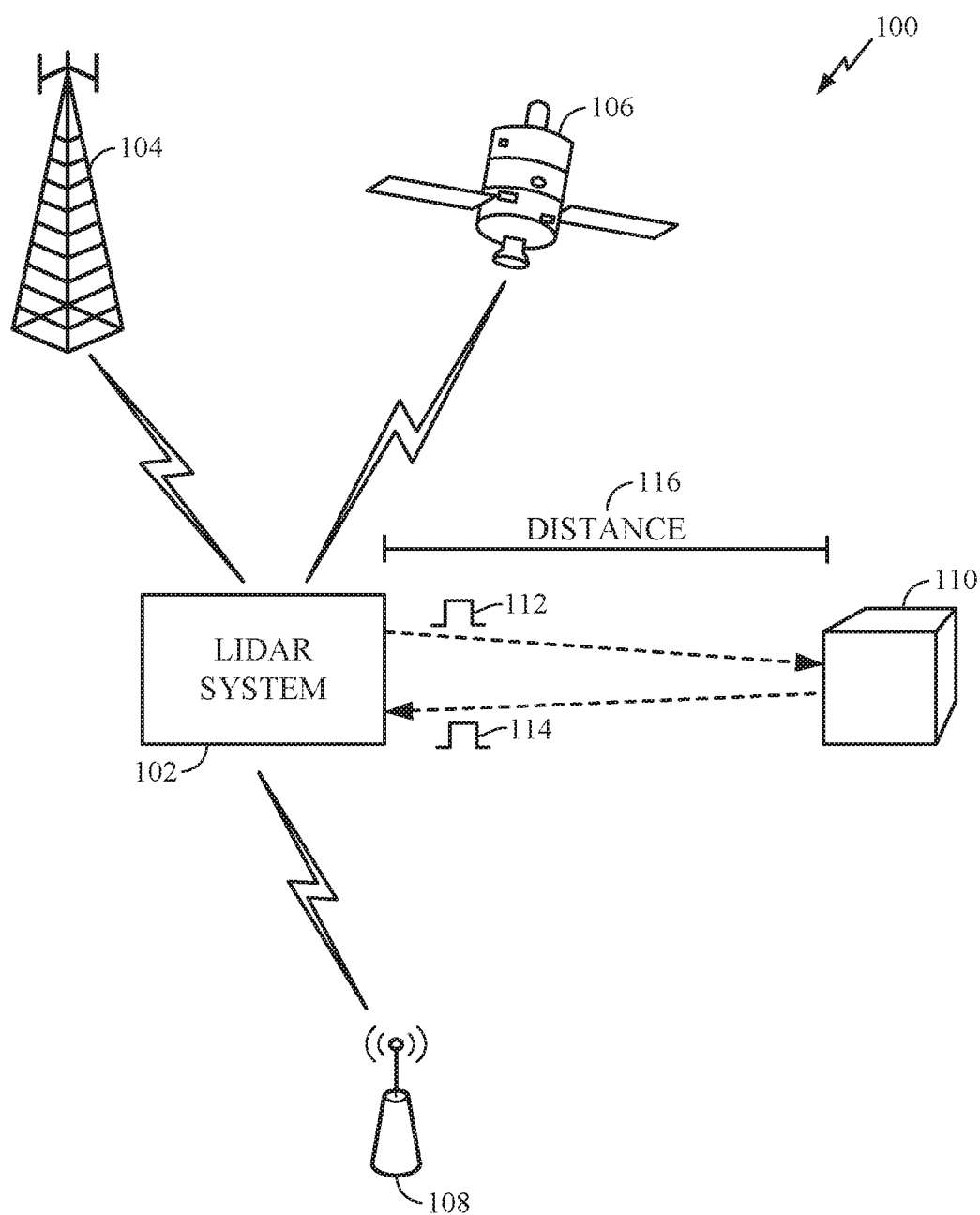
FIG. 1 is a block diagram illustrating an example LIDAR system.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other embodiments. Likewise, the terms "embodiments of the invention" of "aspects" does not require that all embodiments or aspects include the discussed feature, advantage or mode of operation.

The terminology used herein is for the purpose of describing particular examples only and is not intended to be limiting of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the examples described herein, the corresponding form of any such examples may be described herein as, for example, "logic configured to" perform the described action.

As mentioned above, the proliferation of LIDAR systems operating in close proximity to one another has increased the likelihood of interference among these LIDAR systems. Accordingly, aspects discussed herein address this issue through the use of time synchronization among the LIDAR systems in such a way that the timing of the firing of the LIDAR pulse is synchronized with a universal clock signal that is common to all the LIDAR systems. In one aspect, timing synchronization refers to a LIDAR system that assigns a firing time of when to generate a laser pulse at a prescribed time using the universal clock signal as a reference. Thus, when other LIDAR systems also use the same universal clock signal for assigning their firing times, it allows all involved LIDAR systems to choose a firing time that minimizes the probability of interference with nearby LIDAR systems.

FIG. 1 is a block diagram illustrating an example LIDAR system 102 operating in an environment 100. As shown in FIG. 1, LIDAR system 102 is configured to measure a distance 116 from LIDAR system 102 to object 110. In one aspect, LIDAR system 102 utilizes a the Time of Flight method (ToF), where the LIDAR system 102 is configured to measure a time delay between the time at which a laser pulse 112 is sent into the environment 100, and the time at which the reflected signal pulse 114 (also referred to herein as an echo) is detected by the LIDAR system 102.

In one aspect, LIDAR system 102 is configured to operate within a particular range of operation. Thus, LIDAR system 102 may include a maximum allowed delay between sending the laser pulse 112 and receiving the reflected signal pulse 114 (e.g., echo-P). This delay defines the maximum range R that the system can measure, as R=Pc/2, where c is speed of light. In ideal conditions for operation of the LIDAR system 102, no interference/noise signal is received by the LIDAR system 102 during the time interval P after the laser sends the laser pulse 112. This requirement, in turn, may limit the maximum frequency F=1/P of the generated laser pulses 112.

Thus, for a single standalone LIDAR system 102 with no other LIDAR systems operating within environment 100, noise free and interference free operation can be ensured at the range R if the laser firing rate is less than F. However, as mentioned above, there may be a situation where there are multiple co-located LIDAR systems operating within the same environment 100 resulting in the possibility of interference between the LIDAR systems. That is, a laser pulse generated by one LIDAR system may be erroneously detected as a reflected pulse by another LIDAR system resulting in a possible error in the distance measurements.

As will be discussed in more detail below, the LIDAR system 102 may receive a universal clock signal that is common to one or more other LIDAR systems operating within environment 100 in order to synchronize the firing time(s) of the laser pulse 112. For example, a GPS receiver included in the LIDAR system 102 may extract timing information from a signal transmitted by the GPS satellite 106, so that LIDAR system 102 can adjust a system clock to the time reference provided by the GPS satellite 106.

Once the time lock is achieved, the system time is in sync with the UTC time (or any other time reference), and LIDAR system 102 can operate the laser pulse 112 firing timing based on the UTC time, thus allowing coordination of the firing timing between different LIDAR systems operating within environment 100. This coordination is used to assist in mitigation and abatement of the interference between various LIDAR systems. In one aspect, LIDAR system 102 uses GPS as a reference to a suitable source of the satellite timing source, including Galileo, BeiDuo, and any other operational system.

For example, a satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 106. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The LIDAR system 102 is not limited to use with an SPS for obtaining a universal clock signal, as timing synchronization techniques may be implemented in conjunction with various wireless communication networks, including cellular towers 104 and from wireless communication access points 108, such as a wireless wide area network (WWAN), a wireless local area network (WLAN), a wireless personal area network (WPAN). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 2:
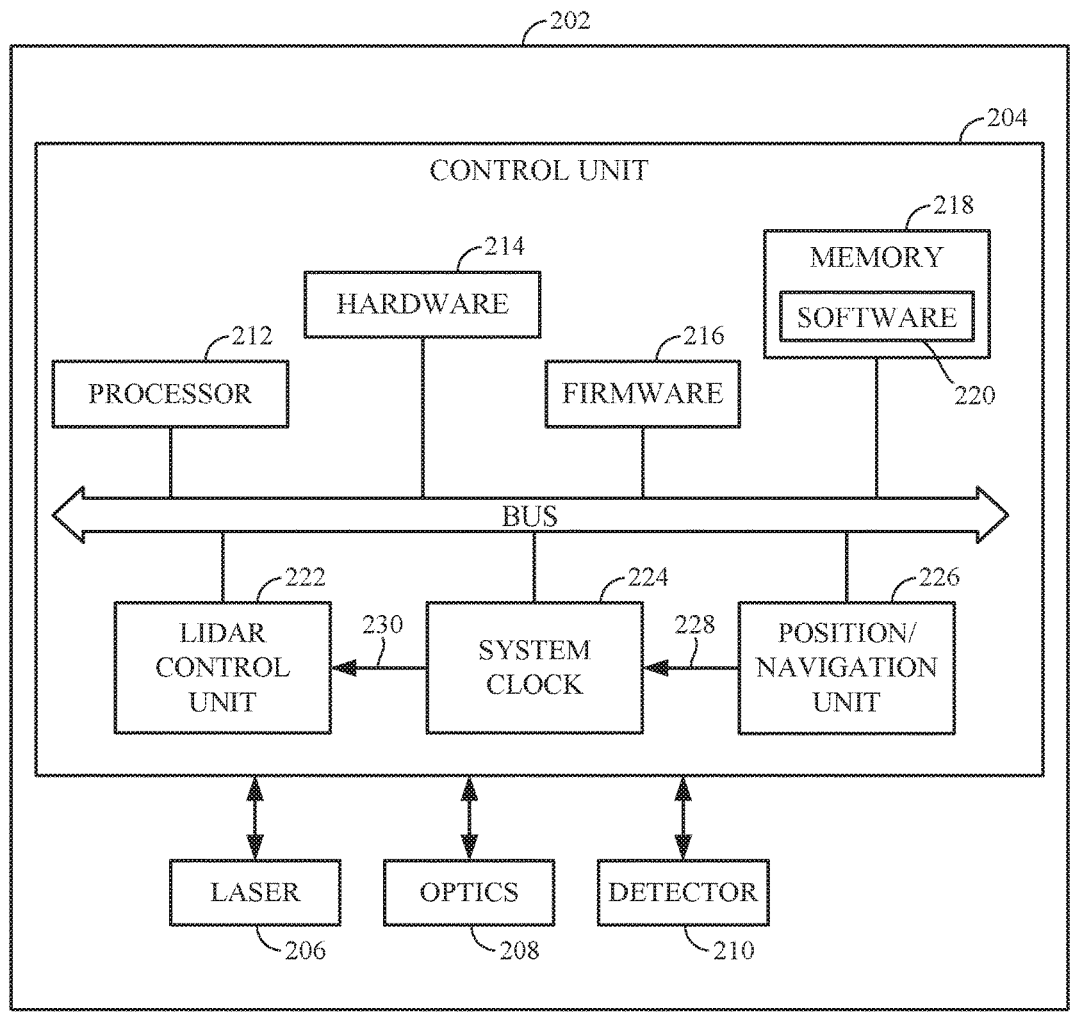
FIG. 2 is a block diagram illustrating an example LIDAR system.

FIG. 2 is a block diagram illustrating an example LIDAR system 202. LIDAR system 202 is one possible implementation of LIDAR system 102 of FIG. 1. LIDAR system 202 may also be a device including wireless communication devices, computers, laptops, etc. which are capable of LIDAR operations.

LIDAR system 202 includes a control unit 204 that is connected to and communicates with the laser 206, optics 208, and detector 210. The control unit 204 accepts and processes data received from detector 210. Control unit 204 may be provided by a processor 212, hardware 214, firmware 216, memory 218, and software 220.

The illustrated example of control unit 204 furthers includes a LIDAR control unit 222, a system clock 224, and a position/navigation unit 226. Processor 212, LIDAR control unit 222, system clock 230, and position/navigation unit 226 are illustrated separately for clarity, but may be a single unit and/or implemented in the processor 212 based on instructions in the software 220 which is run in the processor 212. Processor 212, as well as the LIDAR control unit can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with LIDAR system 202, and is not to be limited to any particular type of memory or number of memories, or type of media upon which memory is stored.

The laser 206 is configured to emit (e.g., produce, propagate) electromagnetic radiation at one or more frequencies that can be, for example, a coherent light emission (e.g., monochromatic light emission) or beam. Laser 206 may be configured to emit ultraviolet, visible, or near infrared light. In one aspect, the laser pulse generated by laser 206 is directed through optics 208, where the optics 208 control the angular resolution and range that can be detected by LIDAR system 202. Optics 208 may also be configured to receive the reflected pulse (e.g., reflected pulse 114) by way of a hole mirror or beam splitter. In one example, optics 208 are configured to perform scanning operations to control the direction of the laser pulse generated by laser 206. For example, optics 208 may include hardware to scan the azimuth and elevation, such as dual oscillating plane mirrors, a polygon mirror, or a dual axis scanner. The detector 210 may be coupled to the optics 208 to receive and detect the reflected pulse (e.g., reflected pulse 114). In one example, detector 210 is a solid state photodetector, such as one or more silicon avalanche photodiodes. In another example, detector 210 is a photomultiplier.

As shown in FIG. 2, control unit 204 further includes a position/navigation unit 226 which may include one or more GPS receivers configured to receive and process a universal clock signal 228 that is common to one or more other LIDAR systems. In one example, universal clock signal 228 is a coordinated universal (UTC) signal. Control unit 204 is configured to then synchronize a system clock 224 with the universal clock signal 228 to generate a synchronized clock signal 230. LIDAR control unit 222 is configured to trigger the laser 206 at a firing time to generate a laser pulse (e.g., laser pulse 112 of FIG. 1) based on the synchronized clock signal 230. LIDAR control unit 222 may then determine a Time of Flight (ToF) based on data received from detector 210.

The processes described herein may be implemented by various means depending upon the application. For example, these processes may be implemented in hardware 214, firmware 216, a combination of processor 212 and software 220, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 218 and executed by the processor 212. Memory may be implemented within or external to the processor 212.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 3:
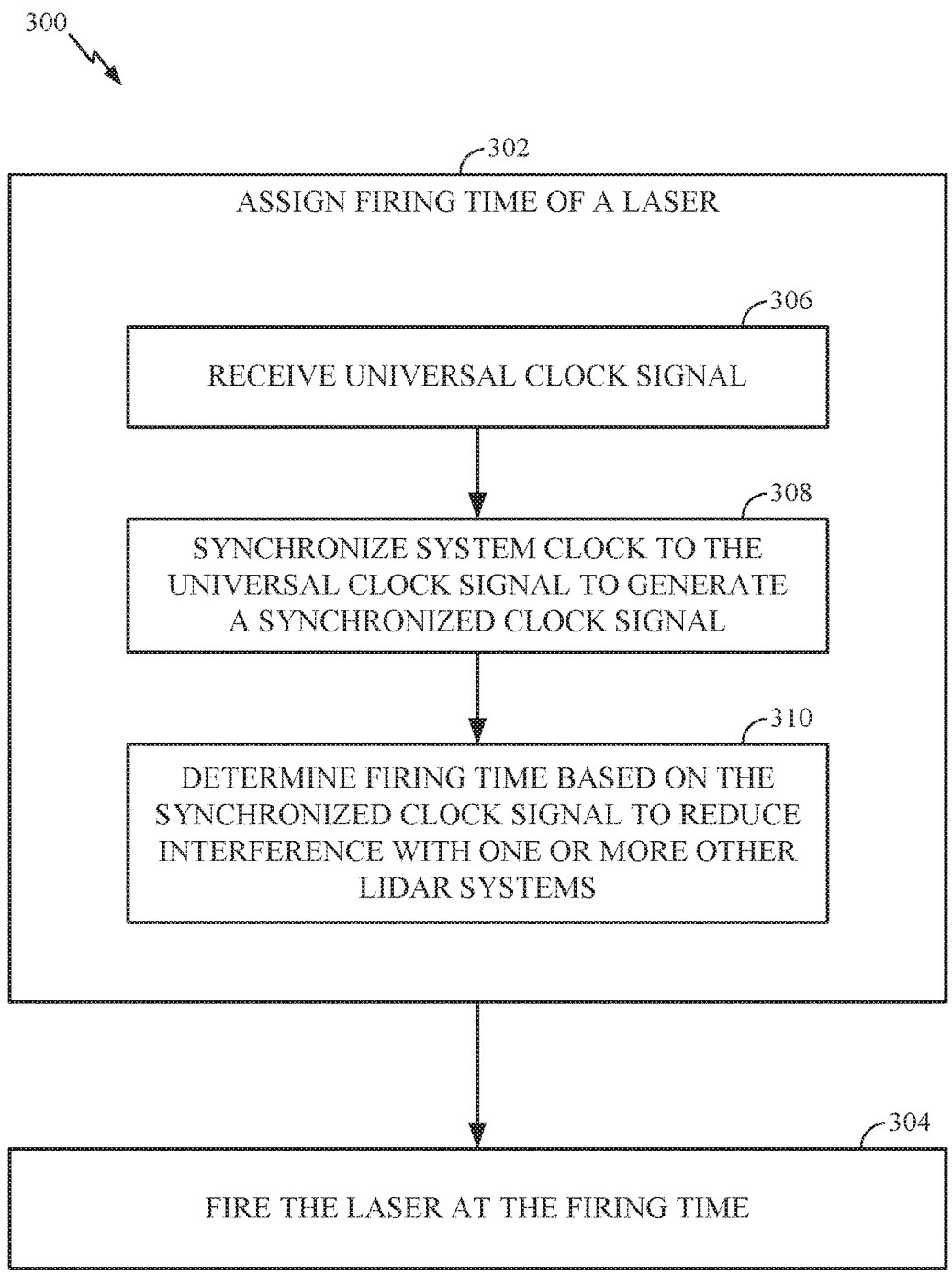
FIG. 3 is a flowchart illustrating a process of timing synchronization of a LIDAR system.

FIG. 3 is a flowchart illustrating a process 300 of timing synchronization of a LIDAR system. Process 300 is one possible process of timing synchronization performed by LIDAR system 102 and/or LIDAR system 202. In a process block 302, the LIDAR system 202 assigns a firing time of a laser (e.g., laser 206) included in the LIDAR system 202. Next, in process block 304, the LIDAR system 202 fires the laser at the firing time to generate the laser pulse 112. Assigning the firing time of the laser may include one or more additional processes, as will now be described with reference to process blocks 306-310. In a process block 306, the LIDAR system receives a universal clock signal (e.g., LIDAR system 202 receives universal clock signal 228 via position/navigation unit 226). Next, in process block 308, the LIDAR system synchronizes a system clock with the universal clock signal to generate a synchronized clock signal (e.g., LIDAR system 202 synchronizes system clock 224 with universal clock signal 228 to generate a synchronized clock signal 230). In one example, system clock 224 includes an ultra-stable, vibration de-sensitized, oven or temperature stabilized local oscillator where synchronizing the system clock 224 to the universal clock signal 228 includes phase-locking the local oscillator to the incoming received GPS waveform (e.g., universal clock signal 228), where the local oscillator is configured to flywheel during intermittent outages of the received GPS signal so as to maintain synchronization within a specified maximum amount of time drift. In process block 310, the LIDAR system determines the firing time based on the synchronized clock signal to reduce interference with one or more other LIDAR systems (e.g., LIDAR control unit 222 controls the firing time of laser 206 based on the synchronized clock signal 230).

Figure 4:
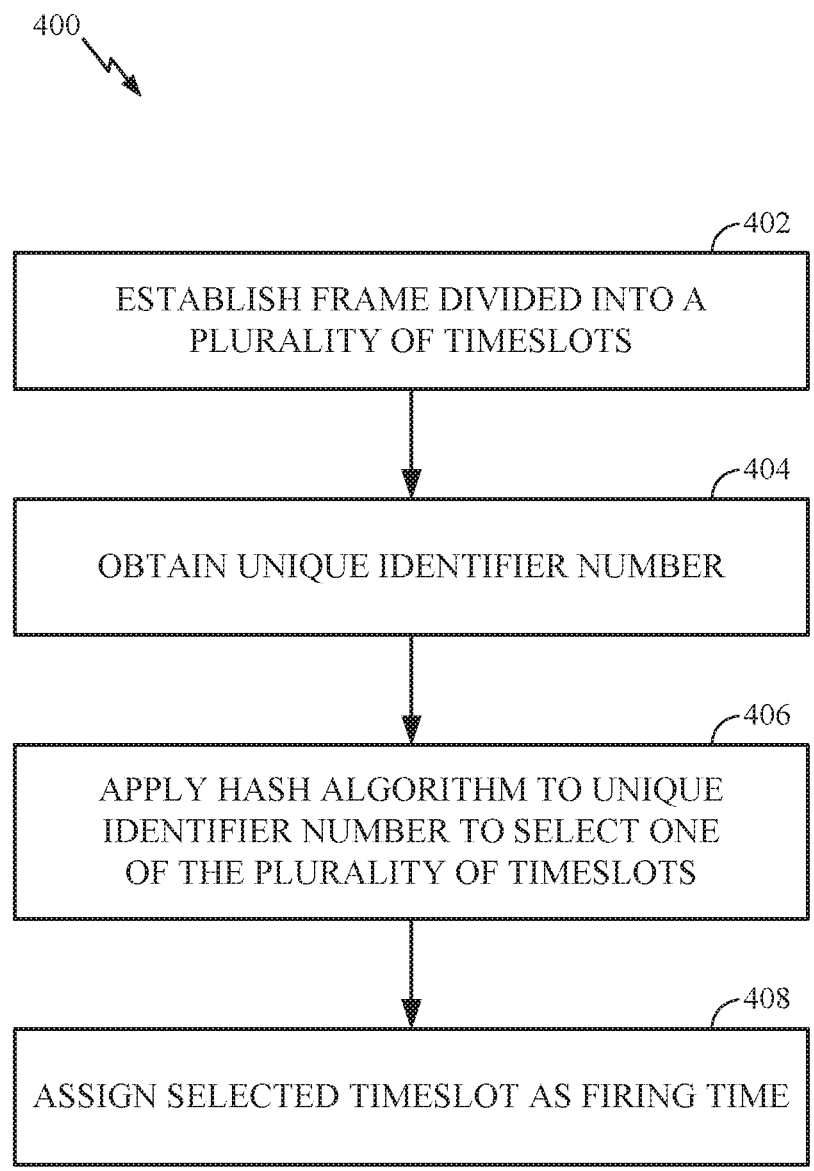
FIG. 4 is a flowchart illustrating a process of assigning a firing time in a LIDAR system.

FIG. 4 is a flowchart illustrating a process 400 of assigning a firing time in a LIDAR system. Process 400 is one possible implementation of process block 310 of FIG. 3. In process block 402, the LIDAR control unit 222 establishes frames in the synchronized clock signal 230, where each frame is divided into a plurality of timeslots. FIG. 5 is a timing diagram illustrating an example frame 502 divided into several timeslots (504a-c, 506a-c, 508a-c, and 510a-c) for assigning firing times for several LIDAR systems operating in the same environment (e.g., environment 100 of FIG. 1). As shown in FIG. 5, the frame begins at time T0. In one aspect, synchronization among different LIDAR systems allows time T0 to be the same for each LIDAR system. That is, each LIDAR system is configured to generate a frame at the same time T0. In one example, the frame length (i.e., Tn-T0) as well as the number and length of each timeslot (504a-c, 506a-c, 508a-c, and 510a-c) is predetermined and the same among LIDAR systems operating within the same environment.

Referring now back to FIG. 4, in process block 404 the LIDAR control unit 222 obtains a unique identifier number that is unique to each LIDAR system operating within an environment 100. For example, LIDAR system 202 may be assigned a LIDAR System Identification Number (LSIN) that is separate and distinct from other LIDAR systems operating within environment 100. In one aspect, the LSIN is factory preset. However, in another aspect, the LSIN may be assigned during operation by a server or user of the LIDAR system. In process block 406, LIDAR control unit 222 applies a HASH algorithm to the unique identifier number (e.g. LSIN) in order to select one or more of the timeslots within each frame. For example, assuming LIDAR system 202 is assigned a unique identifier number of LSIN1, application of the HASH algorithm to the LSIN1 number results in the selection of timeslots 504a, 504b, and 504c for LIDAR system 202. As shown in FIG. 5, timeslots 506a, 506b, and 506c are reserved for LIDAR systems having a unique identifier number of LSIN2, while timeslots 508a, 508b, and 508c are reserved for LIDAR systems having a unique identifier number of LSIN3. Similarly, timeslots 510a, 510b, and 510c are reserved for LIDAR systems having a unique identifier number of LSIN4. Next, in process block 408, LIDAR control unit 222 assigns timeslots 504a, 504b, and 504c as the firing times for the laser 206 of LIDAR system 202.

Process 400 of FIG. 4 may further be described as follows:

(1) Establish a length of a que as Q;
(2) apply a hash algorithm on the LSIN to generate the position in the que $P_Q$ where $P_Q$ is between 0 and Q-1; and
(3) Establish a frame of the LIDAR pulses, as a sequence of timeslots, with total number of timeslots in the frame as $N_F$. Respectively, the duration of the frame is $P*N_F$.

In one aspect, within each frame, the timing $T_{SPN}(P_Q)$ of the firing for the individual LIDAR system is defined by the position in the que and sequential pulse number SPN: $T_{SPN}(P_Q)=(P_Q SPN*Q)*P$; SPN is ranging between 0 and $N_F/Q$. As the sequence of laser firing repeats itself each frame, each LIDAR system can fire its laser at identical times within the frame, so in some aspects the firing time may be incremented by the number of elapsed frames GFN multiplied by the frame duration $PN_F$, respectively. In some examples, the global timing $T_{Global}$ of the laser firing will be determined as:

$$T_{Global}(P_q)=PN_F GNF+T_{SPN}(P_Q)$$

This approach will reduce the probability for one LIDAR system to become a source of the interference for another. The value of Q should be conservatively established to allow for practical number of multiple LIDAR systems operating at the same location, but not too large so that we do not lose too many time slots.

In some examples, the assignment of the firing slot to the LIDAR system based on LSIN hash, as described above, may not work, due to the fact that the speed of light is limited. For example, even when a LIDAR system of LSIN1 fires in its dedicated timeslot, another LIDAR system of LSIN2 may observe overlap of the timeslot from the LIDAR system of SLIN1, due to the propagation delay and/or due to a relative time drift between local oscillators. Thus, is some implementations, the position of the LIDAR system should be considered in order to establish the time for the firing. For example, for a given range R, two systems could be spaced up to a 2R distance, and still generate interference for each other in their assigned time slots.

Thus, in one aspect, a frame may include guard timeslots interleaved with active timeslots. For example, a guard timeslot may be added after each active time slot, so that no system is allowed to fire for the duration P after it's assigned, as shown in FIG. 6. FIG. 6 is a timing diagram illustrating a frame 602 divided into guard timeslots 610 and active timeslots (604a-b, 606a-b, and 608a-b) for assigning firing times for a LIDAR system. As shown in FIG. 6, the guard timeslots 610 are interleaved with the active timeslots (604a-b, 606a-b, and 608a-b). Each LIDAR control unit 222 of a LIDAR system is configured to not assign any of the guard timeslots 610 as firing times for their respective lasers

206. Accordingly, the timing $T_{SPN}(P_Q)$ of the firing in the frame for the individual LIDAR system may be defined by the position in the que and sequential pulse number SPN and additional guard time slot: $T_{SPN}(P_Q)=(2P_Q+SPN*Q)*P$. In one aspect, the duration P of the guard timeslots 610 may be defined to have a maximum specified relative drift between respective local oscillators.

Further aspects of the teachings herein recognize that in the real world, there may be multiple geographically dispersed LIDAR systems, where the processes described above for 1-dimensional distribution of the LIDAR systems, will work for 2D distribution of the systems as well.

Furthermore, aspects discussed herein may include location-dependent customizations. For example, the values of the tuning parameters (e.g., frame length, number of timeslots, timeslot duration P, etc.) could be adjusted based on the location of the LIDAR system, as the terrain profile, traffic patterns, urban or rural environment will impact the practical values of the system operation. For example, we can have range R to have bigger value in Arizona desert, and reduce it in Lower Manhattan.

In one aspect, assigning the firing time of the laser, as described above with reference to process block 302 of FIG. 3 may further include determining a range of operation of the LIDAR system and adjusting a period (P) of each of the timeslots (e.g., timeslots 504-510 of FIG. 5, and/or timeslots 604-610 of FIG. 6) based on the determined range of operation. For example, determining the range of operation may include obtaining location data specific to a current location of the LIDAR system where the range of operation is based on the location data. In one aspect, the location data may include a physical location of the LIDAR system (e.g., obtained via position/navigation unit 226), a terrain profile proximate to the physical location of the LIDAR system (e.g., stored in memory 218), a traffic pattern for an area proximate to the physical location of the LIDAR system (e.g., obtained via a wireless transceiver included or attached to the LIDAR system), a type of the physical location of the LIDAR system being an urban environment, and/or a type of the physical location of the LIDAR system being a rural environment. In some examples, a terrain profile that indicates many hills or physical obstructions may result in the LIDAR system reducing the period (P) of each of the timeslots included in the frame. Similarly, a traffic pattern that indicates a high amount of traffic may result in the LIDAR system reducing the period (P) when compared to a traffic pattern of a relative low amount of traffic. Furthermore, as discussed above, a type of the physical location being an rural environment may allow the LIDAR system to increase the period (P) as compared to the type of the physical location being an urban environment.

Figure 7:
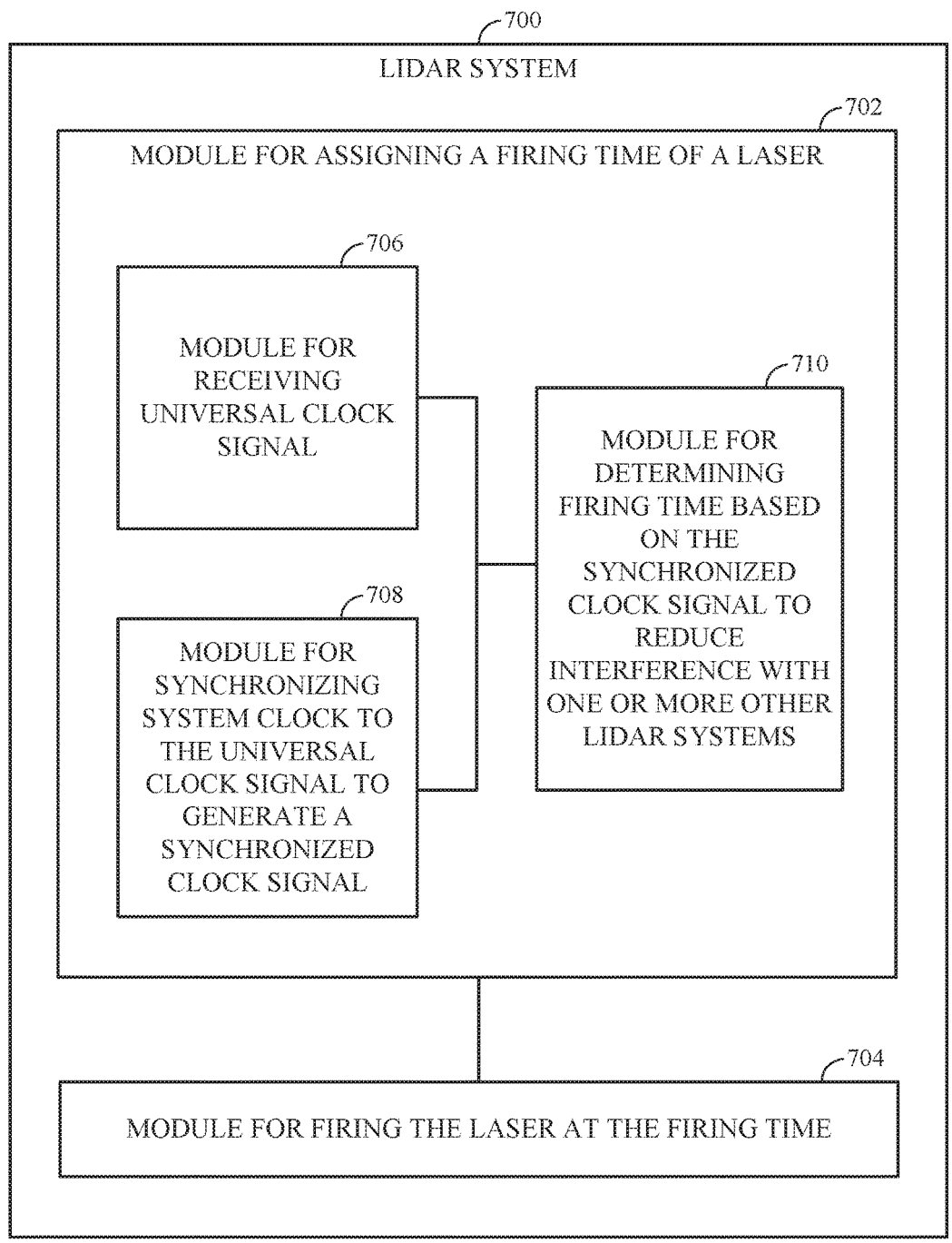
FIG. 7 is a simplified block diagram of several sample aspects of components that may be employed in a LIDAR system and configured to support timing synchronization of the LIDAR system as taught herein.

FIG. 7 is a simplified block diagram of several sample aspects of components that may be employed in a LIDAR system 700 and configured to support timing synchronization of the LIDAR system 700 as taught herein. LIDAR system 700 is one possible implementation of LIDAR system 102 and/or 202. As shown in FIG. 7, LIDAR system 700 includes a module 702 for assigning a firing time of a laser as well as a module 704 of firing the laser at the firing time. The module 704 for firing the laser at the firing time may correspond at least in some aspects to, for example, a LIDAR control unit 222 and/or a laser 206, as discussed herein. The module 702 for assigning the firing time of the laser may include several modules, shown in FIG. 7 as modules 706-710. For example, a module 706 for receiving a universal clock signal may correspond at least in some aspects to, for example, a position/navigation unit 226, as discussed herein. A module 708 for synchronizing a system clock to the universal clock to generate a synchronized clock signal may correspond at least in some aspects to, for example, a system clock 224 and/or LIDAR control unit 222, as discussed herein. A module 710 for determining the firing time based on the synchronized clock signal to reduce interference with one or more other LIDAR systems may correspond at least in some aspects to, for example, LIDAR control unit 222, as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, aspects of the present disclosure can include a computer readable media embodying a method for timing synchronization of a LIDAR system to reduce interference with other LIDAR systems. Accordingly, the invention is not limited to illustrated examples and any means for performing the functionality described herein are included in aspects of the invention.

While the foregoing disclosure shows illustrative aspects and examples of the invention, it should be noted that various changes and modifications could be made herein without departing from the scope of the invention as defined by the appended claims. The functions, steps and/or actions of the method claims in accordance with the examples described herein need not be performed in any particular order. Furthermore, although elements of the invention may be described or claimed in the singular, the plural is contemplated unless limitation to the singular is explicitly stated.

What is claimed is:

1. A method for use with a LIght Detection And Ranging (LIDAR) system, the method comprising:
   assigning a firing time of a laser included in the LIDAR system, wherein assigning the firing time includes:
      receiving a universal clock signal at the LIDAR system, the universal clock signal common to one or more other LIDAR systems;
      synchronizing a system clock of the LIDAR system to the universal clock signal to generate a synchronized clock signal; and
      determining the firing time based on the synchronized clock signal to reduce interference with the one or more other LIDAR systems, including
         establishing a frame divided into a plurality of timeslots,
         assigning one or more of the plurality of timeslots as the firing time for the LIDAR system,
         obtaining a unique identifier number that is unique to the LIDAR system, and
         applying a HASH algorithm to the unique identifier number to select which of the plurality of timeslots to assign as the firing time for the LIDAR system; and
   firing the laser at the firing time.

2. The method of claim 1, wherein the universal clock signal is a coordinated universal time (UTC) signal.

3. The method of claim 2, wherein the UTC signal is obtained via GPS.

4. The method of claim 1, wherein the universal clock signal is a GPS time signal.

5. The method of claim 1, further comprising incrementing the firing time for the LIDAR system based on a number of elapsed frames multiplied by a duration of the frame.

6. The method of claim 1, wherein the plurality of timeslots includes guard timeslots interleaved with active timeslots, and wherein assigning one of the plurality of timeslots as the firing time for the LIDAR system comprises selecting only one or more of the active timeslots as the firing time.

7. The method of claim 1, wherein assigning the firing time of the laser further comprises:
   determining a range of operation of the LIDAR system; and
   adjusting a period of each of the plurality of timeslots based on the range of operation.

8. The method of claim 7, wherein determining the range of operation of the LIDAR system comprises:
   obtaining location data specific to a current location of the LIDAR system, wherein determining the range of operation of the LIDAR system is based on the location data.

9. The method of claim 8, wherein the location data consists of at least one data selected from the group consisting of: a physical location of the LIDAR system, a terrain profile proximate to the physical location of the LIDAR system, a traffic pattern for an area proximate to the physical location of the LIDAR system, a type of the physical location of the LIDAR system being an urban environment, the type of the physical location of the LIDAR system being a rural environment.

10. A LIght Detection And Ranging (LIDAR) system, comprising:
    a laser;
    memory adapted to store program code; and
    a processing unit coupled to the memory to access and execute instructions included in the program code to direct the LIDAR system to:
    assign a firing time of the laser, wherein the instructions to assign the firing time includes instructions to:
       receive a universal clock signal at the LIDAR system, the universal clock signal common to one or more other LIDAR systems;
       synchronize a system clock of the LIDAR system to the universal clock signal to generate a synchronized clock signal; and
       determine the firing time based on the synchronized clock signal to reduce interference with the one or more other LIDAR systems, wherein the determining includes
          establishing a frame divided into a plurality of timeslots,
          assigning one or more of the plurality of timeslots as the firing time for the LIDAR system,
          obtaining a unique identifier number that is unique to the LIDAR system, and
          applying a HASH algorithm to the unique identifier number to select which of the plurality of timeslots to assign as the firing time for the LIDAR system; and
    fire the laser at the firing time.

11. The LIDAR system of claim 10, wherein the universal clock signal is a coordinated universal time (UTC) signal.

12. The LIDAR system of claim 11, wherein the UTC signal is obtained via GPS.

13. The LIDAR system of claim 10, wherein the plurality of timeslots includes guard timeslots interleaved with active timeslots, and wherein the instructions to assign one of the plurality of timeslots as the firing time for the LIDAR system comprises instructions to select only one or more of the active timeslots as the firing time.

14. A LIght Detection And Ranging (LIDAR) system, comprising:
    a laser;
    means for assigning a firing time of a laser included in the LIDAR system, wherein the means for assigning the firing time includes:

means for receiving a universal clock signal at the LIDAR system, the universal clock signal common to one or more other LIDAR systems;

means for synchronizing a system clock of the LIDAR system to the universal clock signal to generate a synchronized clock signal; and means for determining the firing time based on the synchronized clock signal to reduce interference with the one or more other LIDAR systems, the means for determining including means for establishing a frame divided into a plurality of timeslots, means for assigning one or more of the plurality of timeslots as the firing time for the LIDAR system, means for obtaining a unique identifier number that is unique to the LIDAR system, and means for applying a HASH algorithm to the unique identifier number to select which of the plurality of timeslots to assign as the firing time for the LIDAR system; and means for firing the laser at the firing time.

15. The LIDAR system of claim 14, wherein the plurality of timeslots includes guard timeslots interleaved with active timeslots, and wherein the means for determining the firing time of the laser of the LIDAR system comprises means for selecting only one or more of the active timeslots as the firing time.

* * * * *